United States Patent
Jones et al.

(10) Patent No.: US 9,112,980 B2
(45) Date of Patent: Aug. 18, 2015

(54) SYSTEMS AND METHODS FOR SELECTIVELY REVIEWING A RECORDED CONFERENCE

(75) Inventors: Boland T. Jones, Atlanta, GA (US); David Michael Guthrie, Norcross, GA (US); Robert J. Frohwein, Atlanta, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 0 days.

(21) Appl. No.: 13/822,949

(22) PCT Filed: Oct. 29, 2011

(86) PCT No.: PCT/US2011/058489
§ 371 (c)(1),
(2), (4) Date: Feb. 27, 2014

(65) Prior Publication Data
US 2014/0161244 A1    Jun. 12, 2014

Related U.S. Application Data

(63) Continuation-in-part of application No. PCT/US2010/033137, filed as application No. PCT/US2011/058489 on Oct. 29, 2011, and a continuation-in-part of application No. 12/790,193, filed on May 28, 2010.

(30) Foreign Application Priority Data

Apr. 29, 2011  (WO) ................ PCT/US2011/034421
Apr. 29, 2011  (WO) ................ PCT/US2011/034438
Apr. 29, 2011  (WO) ................ PCT/US2011/034472

(51) Int. Cl.
*H04M 3/42*   (2006.01)
*H04M 3/56*   (2006.01)

(52) U.S. Cl.
CPC ........ *H04M 3/56* (2013.01); *H04M 2203/5036* (2013.01)

(58) Field of Classification Search
USPC ..................................... 379/202.01; 709/205
See application file for complete search history.

(56) References Cited

U.S. PATENT DOCUMENTS

2005/0053214 A1* 3/2005  Reding et al. ............ 379/202.01
2005/0210105 A1* 9/2005  Hirata et al. .................. 709/205

* cited by examiner

*Primary Examiner* — Quynh Nguyen
(74) *Attorney, Agent, or Firm* — Smith Risley Tempel Santos LLC

(57) ABSTRACT

A method for selectively reviewing a conference includes synchronously recording an audio conference and content presented in a conference user interface to generate a recorded conference, the conference user interface published to a client device associated with one or more participants, using a characteristic of the conference user interface to index the recorded conference and providing a review interface, responsive to at least one indicator that identifies content of interest within the recorded conference. A conferencing system includes client devices with respective displays, a conference host computer operating a web server and coupled to the client devices via one or more networks, and a data store coupled to the conference host computer. The data store includes a synchronously recorded audio conference and content presented in a conference user interface that defines a recorded conference. The recorded conference includes an index responsive to a characteristic of the conference user interface.

10 Claims, 7 Drawing Sheets

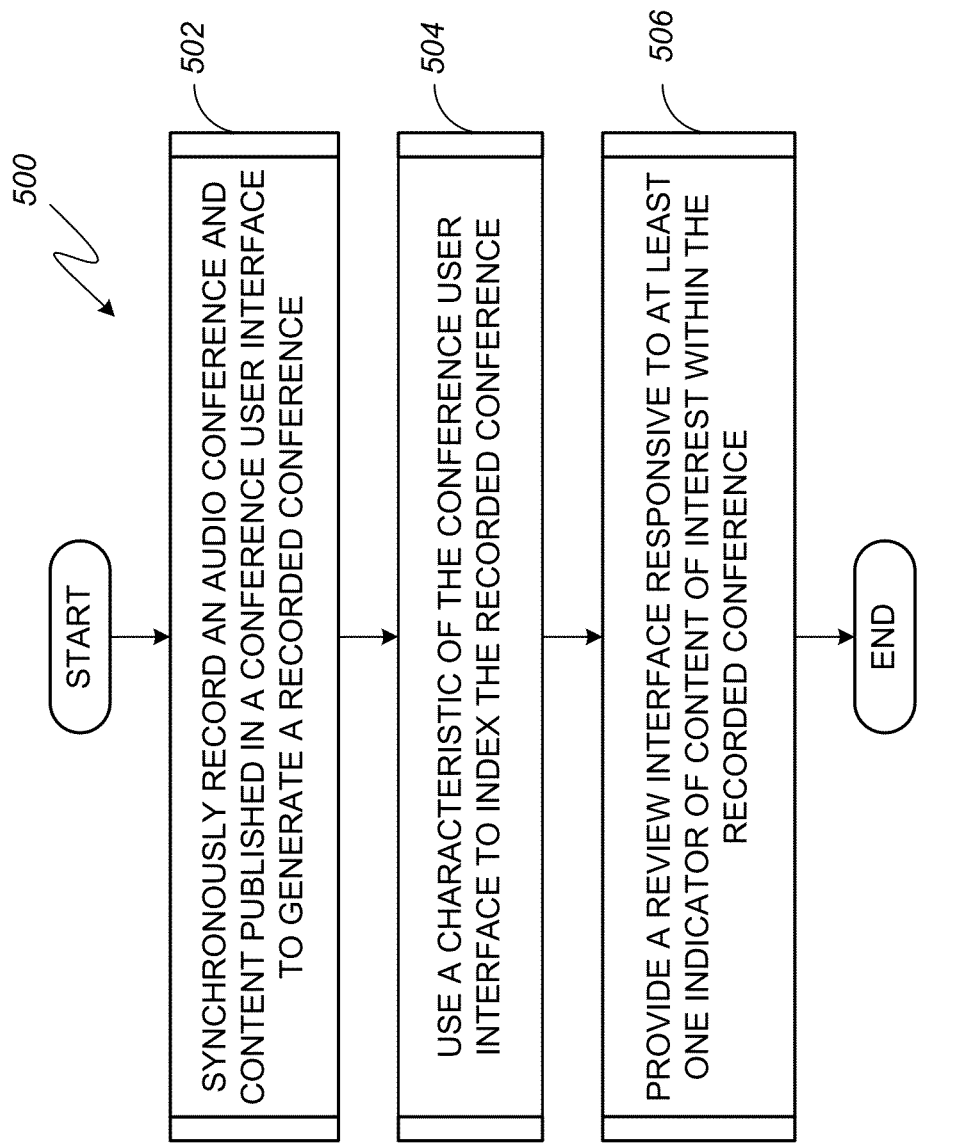

SYSTEMS AND METHODS FOR SELECTIVELY REVIEWING A RECORDED CONFERENCE

CROSS-REFERENCE TO RELATED APPLICATIONS

This application is a continuation-in-part patent application of and claims priority to PCT Patent Application Serial No. PCT/US2010/033137, entitled "Record and Playback in a Conference" (First Named Inventor: Boland T. Jones; and filed on Apr. 30, 2010, which is hereby incorporated by reference in its entirety. This application is related by subject matter to U.S. patent application Ser. No. 12/790,193, entitled "Record and Playback in a Conference;" First Named Inventor: Boland T. Jones; and filed on May 28, 2010, which is hereby incorporated by reference in its entirety. This application is further related by subject matter to U.S. patent application Ser. No. 12/771,366, entitled "Location-Aware Conferencing With Graphical Interface for Participant Survey;" First Named Inventor: Boland T. Jones; and filed on Apr. 30, 2010, which is hereby incorporated by reference in its entirety.

BACKGROUND

Currently, there are a number of conference solutions for enabling people to conduct live meetings, conferences, presentations, or other types of gatherings via the Internet, the public switched telephone network (PSTN), or other voice and/or data networks. Participants typically use a telephone, computer, or other communication device that connects to a conference system. The meetings include an audio component and a visual component, such as, a shared presentation, video, whiteboard, or other media to communicate with one another. These conference solutions have become an indispensable form of communication for many businesses and individuals.

Despite the many advantages and commercial success of existing conference, meeting, grouping or other types of gathering systems, there remains a need in the art for improved conference, meeting, grouping or other types of gathering systems, methods, and computer programs.

SUMMARY

Various embodiments of a conferencing system and a method for selectively reviewing a conference are disclosed. One embodiment is a conferencing system that includes an interface that publishes controls to review a recorded conference. The conferencing system includes client devices, a conferencing host computer, and a data store. The client devices are associated with respective display devices. The client devices are coupled to the conferencing host computer via one or more networks. The data store is coupled to the conferencing host computer and includes a synchronously recorded audio conference and content presented in a conference user interface defining a recorded conference, the recorded conference includes an index responsive to a characteristic of the conference user interface.

Another embodiment is a method for selectively reviewing a conference. The method includes synchronously recording an audio conference and the content presented in a conference user interface to generate a recorded conference, the conference user interface published to a client device associated with one or more participants, using a characteristic of the conference user interface to index the recorded conference and providing a review interface, responsive to at least one indicator that identifies content of interest within the recorded conference.

BRIEF DESCRIPTION OF THE DRAWINGS

FIG. 5 is a flow diagram illustrating an embodiment of a method for selectively reviewing a recorded conference.

DETAILED DESCRIPTION

Figure 1:
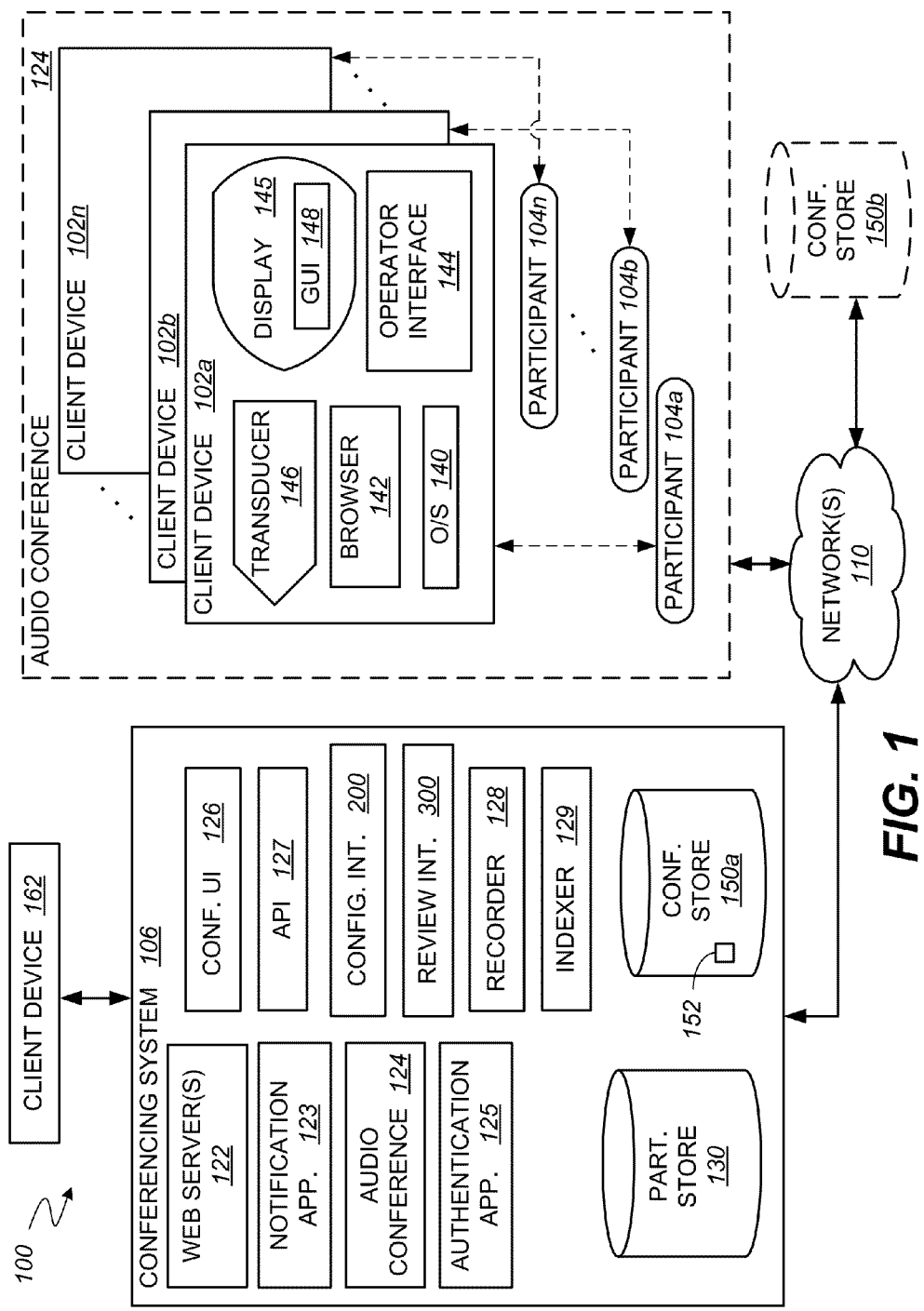
FIG. 1 is a block diagram illustrating an embodiment of a conferencing system for selectively reviewing a conference.

Various embodiments of systems and methods are disclosed for selectively reviewing a recorded conference. A recorded conference includes a synchronized recording of an audio conference and content presented in a conference user interface presented to one or more participants by way of client devices during the audio conference. The recorded conference may comprise any online conference, meeting, grouping, or other types of gatherings (collectively, a "conference", with a system that provides the conference being referred to as a "conferencing system") for any variety of purposes of one or more people, groups or organizations (including combinations thereof and collectively referred to as "participants"), including, without limitation, enabling simulcast audio with such conference for the participants. Exemplary embodiments of the conference and a conferencing system and related features may be implemented as described in the parent patent application, U.S. patent application Ser. No. 12/771,979, the entire contents of which are hereby incorporated by reference into this specification. Additional exemplary embodiments of the conference and a conferencing system that supports the conference and related features are further described in U.S. patent application Ser. No. 12/790,193, the entire contents of which are also incorporated herein by reference.

An administrator, user or subscriber to the conferencing system accesses an index configuration interface operable on a conference host computer to identify information to be applied to a conference as it is being recorded or reviewed. The conference or recorded conference is modified by inserting one or pointers or locators when the identified information to be applied is present in the conference data either as it is being recorded or when the identified information is present in a recorded conference as it is being reviewed.

For example, an administrator of the conferencing system determines that conference participant feedback will be of interest to a reviewer of the recorded conference. Conference participant feedback can be communicated on multiple levels. Conference participant feedback is communicated by participants of the conference as the conference is recorded as described in U.S. application Ser. No. 12/771,366, the entire contents of which are hereby incorporated by reference into this specification. Participant level feedback includes a score, a sign, or other indicator communicated by a participant of the recorded conference by way of an associated client device. The score or sign will generally indicate a participant's respective opinion regarding what is presently being presented in the conference. Conference level participant feedback includes a measure of feedback from two or more participants of the recorded conference. As the conference level participant feedback may vary (e.g., positive, neutral, negative, among others) among the conference participants, the measure of feedback may be mathematically or statistically combined.

By way of further example, an administrator of the conferencing system determines that a participant's audio channel will be of interest to a reviewer of the recorded conference. Accordingly, the administrator configures the conferencing system to apply this information as the conference is being recorded. Note that this can also be configured as a default operation of an indexer and/or a recorder associated with the conferencing system. When the conferencing system is so configured, the conferencing system will use one or more characteristics of the conference user interface to index the conference. For example, a characteristic of a participant information cube can be used to identify when a particular participant is speaking. As indicated previously, the conference information can be so modified (i.e., indexed) either in real time as the conference is being initially recorded or at any desired time thereafter, while a recorded conference is being reviewed. Note that a review operation may be performed under the direction and control of a user of the conferencing system through the operation of a client device coupled to the conferencing system or alternatively a review operation may be automated and operate under the direction and control of a processor executing a routine or routines each of which including one or more executable instructions.

An administrator, user or subscriber to the conferencing system accesses a second or review interface to replay a recorded and modified (i.e., indexed) conference as may be desired. The second or review interface includes controls to play or rewind in real-time, as well as controls for moving forward or in reverse in accordance with one or more advanced rates to review the recorded conference. Additional controls are included for pausing and/or stopping the recorded conference.

The second or review interface is a graphical user interface that presents those portions of the recorded conference where an identified participant is speaking, the recorded conference skipping over those portions of the recorded conference where participants other than the identified participant are speaking. This is accomplished by the operator selecting a participant of interest in the review interface. The conferencing system responds by presenting a timeline that reveals those times during the recorded conference when the participant of interest was speaking. An indicator in registration with the timeline can be manipulated by an operator of the client device to navigate through the recorded conference as may be desired.

In another mode of operation, the second or review interface enables an administrator, user or subscriber to the conferencing system to control a review of a recorded and modified (i.e. indexed) conference based on the presence or lack thereof of an identified feedback characteristic. In this review mode, an operator of the review interface identifies a select feedback characteristic to identify portions of the recorded conference for review. When the identified or select feedback characteristic is present in the recorded conference, the playback of the recorded conference skips over those portions of the recorded conference where one or more feedback characteristics other than the identified or select feedback characteristic is present. In this way, a reviewer of the prerecorded conference can selectively review portions of the prerecorded conference that related to the feedback of interest.

FIG. 1 illustrates a conferencing environment 100 representing an exemplary working environment for enabling participants 104 to join an audio conference 124. The participants 104 are registered subscribers of a conference service provided by the conferencing system 106. The audio conference 124 comprises client devices 102 in communication with a conferencing system 106 and web server(s) 122 via one or more communication networks 110. The network(s) 110 may support wired and/or wireless communication via any suitable protocols, including, for example, the Internet, the Public Switched Telephone Network (PSTN), cellular or mobile network(s), local area network(s), wide area network(s), or any other suitable communication infrastructure. The conferencing system 106 establishes a conference (e.g., an audio conference 124) between client devices 102 associated with participant 104a and participant 104b. The audio conference 124 may have a corresponding online component presented to participant 104a and participant 104b via a conference user interface 126. In an embodiment, the conference user interface 126 may be configured in any of the ways described in the above-referenced parent patent applications, or others, to provide a visually engaging conference experience via the browser 142 to participants 104. When the client device 102 is arranged with an integrated transducer 146 or coupled to an external transducer or transducers, the conference user interface 126 can produce sound at designated times such as when a participant 104n joins the audio conference 124.

The client devices 102 may comprise any desirable client device, which is configured to communicate with the conferencing system 106 and the web server(s) 122 via the networks 110. The client device 102 may comprise, for example, a personal computer, a desktop computer, a laptop computer, a mobile client device, a portable computing device, a smart phone, a cellular telephone, a landline telephone, a soft phone, a web-enabled electronic book reader, a tablet computer, or any other client device 102 capable of communicating with the conferencing system 106 and/or the web server(s) 122 via one or more networks 110. The client device 102 may include a display device 145, a processor, memory, and software, including an operating system 140, a graphical user interface 148, and client software (e.g., a browser 142, plug-in, or other functionality) configured to facilitate communication with the conferencing system 106 and the web server(s) 122. It should be appreciated that the hardware, software, and any other performance specifications of the client device 102 are not critical and may be configured according to the particular context in which the client device 102 is to be used. In this regard, the client device 102 may include one or more transducers 146 for reproducing one or more an audio signals as well as an operator interface 144 for receiving inputs from an operator of the client device 102. Further in this regard, the operator interface 144 may include one or more of a touch sensitive screen, a keyboard, a microphone, a thumb wheel or other human-machine interface that functions in conjunction with the GUI 148.

The conferencing system 106 generally comprises a communication system for establishing an audio conference 124 between the client devices 102. The conferencing system 106 may support audio via a voice network and/or a data network. In one of a number of possible embodiments, the conferencing system 106 may be configured to support, among other platforms, a Voice over Internet Protocol (VoIP) conferencing platform such as described in U.S. patent application Ser. No. 11/637,291 entitled "VoIP Conferencing," filed on Dec. 12, 2006, which is hereby incorporated by reference in its entirety. It should be appreciated that the conferencing system 106 may support various alternative platforms, technologies, protocols, standards, features, etc. Regardless of the communication infrastructure, the conferencing system 106 is configured to establish a data and/or audio connection with the client devices 102. The conferencing system 106 may establish the audio conference 124 by combining audio streams associated with the participant client devices 102.

The conferencing system 106 includes web server(s) 122, a notification application 123, an authentication application 125, the conference user interface 126, an application programming interface (API) 127, a recorder 128, an indexer 129, a configuration interface 200 and a review interface 300. The web server(s) 122 are computers, virtual machines, or computer operated programs that publish information from the conference user interface 126 to coupled client devices 102 using the Hypertext Transfer Protocol (HTTP), over the networks 110. The conferencing system 106 is coupled to a client device 162 that is arranged with one or more operator to machine interfaces for configuring one or more of the web servers 122, the applications and interfaces.

The authentication application 125 is a computer operated program that is arranged to confirm the identity of a possible conference participant such as the participant 104n before connecting the client device 102n associated with the participant 104n to the audio conference 124 and before exposing the conference user interface 126 via a browser 142 and display 145 to the participant 104n. The authentication application can be arranged to employ any number of queries or information exchanges with the participant 104n in an effort to confirm the identity of the possible conference participant as a subscriber to the conferencing service provided by the conferencing system 106.

The authentication application 125 is arranged to communicate with participant store 130 to complete the participant authentication. The participant store 130 contains the names and/or usernames and access codes for subscribers of the conferencing service supported by the conferencing system 106. In some embodiments the participant store 130 contains additional information that can be used to confirm the identity of subscribers to the conferencing service. This additional information can include images, questions associated with answers entered by an identified subscriber, among other information not commonly known by those other than the subscriber.

The notification application 123 is a computer operated program that is arranged to identify when certain condition(s) are present in the audio conference 124. For example, the notification application 123 is arranged to forward a notice to the conference user interface 126 when participant 104n has requested to join the audio conference 124. The notice directs the conference user interface 126 to apply one or more sounds such as a tone, chime, buzz, etc. to indicate to others that someone has joined the audio conference 124. In addition, the notification application 123 can be arranged to provide participant and conference specific information to the conference user interface 126. Participant and conference specific information may include the identity of the moderator or host of the conference, the subject or title of the conference, a designated start and end time for the conference, a list of those invited to attend, a list of actual attendees, the number of attendees presently connected to the conference, information identifying a present speaker, among other information. The notification application 123 may communicate the occurrence of an event (e.g., that a nonparticipant has joined the conference and transitioned to a conference participant 104) by publishing information from one of the participant store 120 or the conference store 150a. The published information may comprise audio, video, text, graphics, or other information associated with a specified nonparticipant subscriber to the conferencing service. The published information may be configured and/or approved by the nonparticipant. The published information can further include information configured by a moderator or a conferencing system administrator using a cue configuration interface (not shown).

The recorder 128 is an apparatus or a computer operated program that is arranged to synchronously record the audio content associated with the audio conference 124 with content presented by the conference user interface 126. The recorder 128 is configured to interface with a data storage device such as the conference store 150a integrated with the conferencing system 106 or an external conference store 150b communicatively coupled to the conferencing system 106 via one or more data or wireless networks 110.

The indexer 129 is a computer operated program that is arranged to analyze the raw data 152 that comprises the content presented by the conference user interface 126 and/or modify the combination of the synchronously recorded audio content associated with the audio conference 124 and the content presented by the conference user interface 126. The indexer 129 may be arranged to identify time information, characteristics of the user interface including one or more characteristics of a participant information cube, and one or more indicators representing participant feedback in the raw data 152. It should be understood that the indexer 129 can operate in near real time as the conference is being recorded or at any time thereafter.

In accordance with the capabilities of the client device 102, the conference user interface 126 communicates conference information that is embodied on a client device 102 associated with a participant 104. The conference information may be implemented using a push methodology by which the conference information is "pushed" from the conferencing system 106, a pull methodology by which the conference information is "pulled" from the conferencing system 106 by the client device 102 using, for example, the conferencing API 127, or other communication protocols, services, methodologies, etc. The conference information can be presented by hardware and/or software components supported by the client device 102, including, the browser 142, operating system 140, transducer(s) 146 (including speakers and/or vibrators) and the display 145. When the conference information is presented with the display 145, the conference information is presented in the GUI 148.

To expose conference related information and enable interaction with participants via respective client devices 102 coupled to the conferencing system 106, the conferencing system 106 may support various web services for exchanging structured information with the browser 142 or other elements on the client device 102. The web services may be implemented using any suitable protocol. In one embodiment, the web services may be implemented via a Representation State Transfer (REST) architecture or system. In alternative embodiments, the web services may be implemented via the Simple Object Access Protocol (SOAP) using Extensible Markup Language (XML) as the messaging format. The conferencing system 106 may respond to web service calls from one or more of the notification application 123, the authentication application 125, the configuration interface 200, the review interface 300 and additional applications by either returning the requested information immediately or by initiating the request and then providing the results (later) via a polling action. One of ordinary skill in the art will appreciate that any suitable methodology may be used to exchange data between the various applications and configuration modules and the conference system 106. For example, the data may be exchanged in real-time, near real-time, using push and/or pull notifications, or any combination thereof, any of which may be customized by the user.

One of ordinary skill in the art will appreciate that the notification application 123, the authentication application 125, the configuration interface 200, the review interface 300, the recorder 128 and the indexer 129 (and any associated or other modules described herein) may be implemented in software, hardware, firmware, or a combination thereof. In one embodiment, the systems are implemented in software or firmware that is stored in a memory and that is executed by a suitable instruction execution system, such as, for example, an instruction system operable on a server computer or web server(s) 122. In software or firmware embodiments, the logic may be written in any suitable computer language. In hardware embodiments, the systems may be implemented with any or a combination of the following, or other, technologies, which are all well known in the art: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
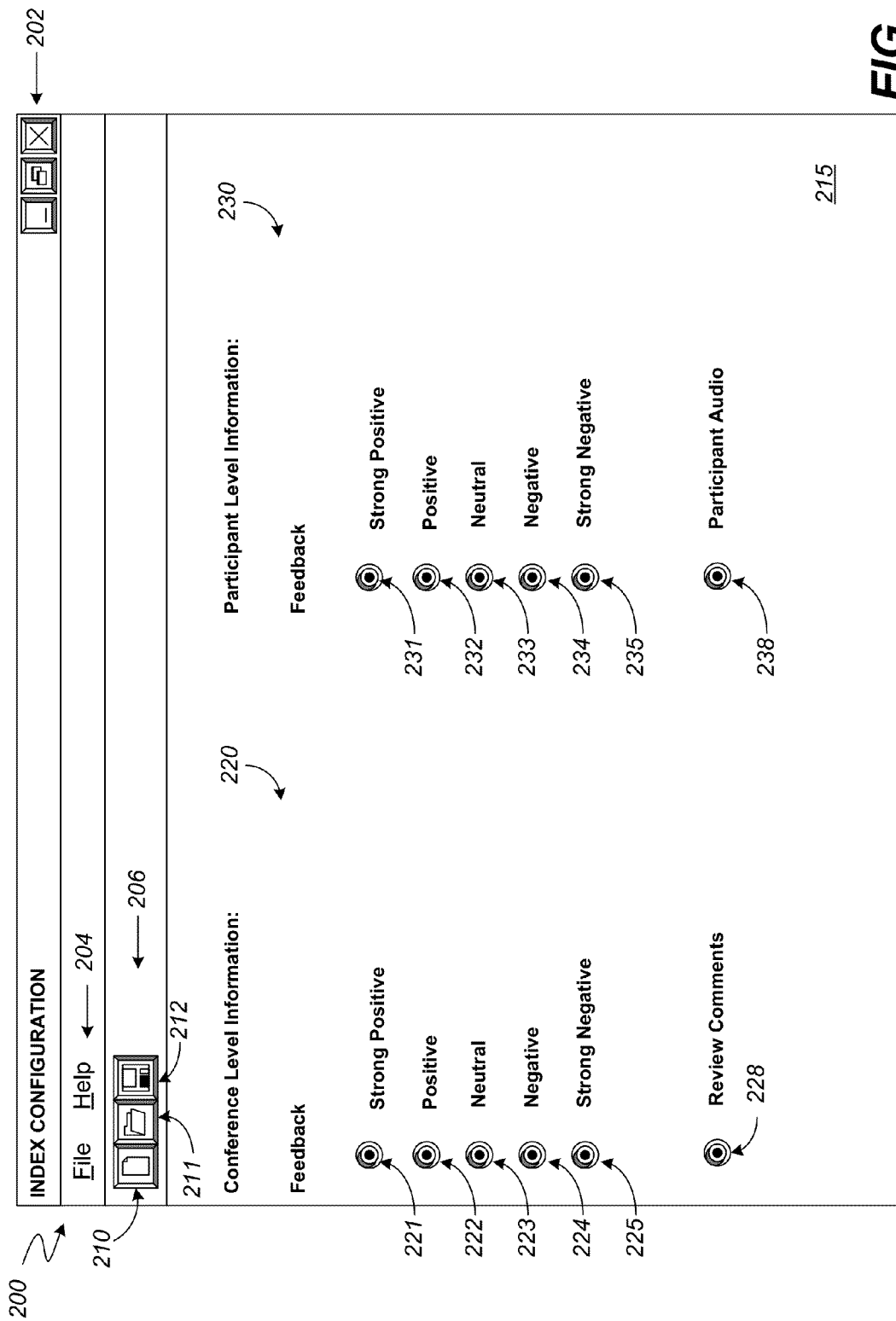
FIG. 2 is a block diagram illustrating an embodiment of the configuration interface of the conferencing system of FIG. 1.

FIG. 2 is a diagram illustrating an embodiment of the configuration interface 200 of the conferencing system 106 of FIG. 1. An administrator, user or subscriber to the conferencing system accesses the configuration interface 200 via client device 162, client device 102 or another suitable device (not shown) coupled to the conferencing system 106. An administrator, user or subscriber to the conference service supported by the conferencing system 106 accesses the configuration interface 200 to communicate information that will be used by the indexer 129 when generating a recorded conference. The configuration interface 200 directs the indexer 129 to identify when conference level information and participant level information are present in the conference information. In addition, the configuration interface 200 directs the indexer 129 to identify when review comments and participant audio are to be indexed.

The example configuration interface 200 includes a title bar 202, a drop-down menu bar 204, a tool bar 206 and a panel 215. The title bar 202 includes a label identifying the configuration interface 200 as an index configuration interface and pushbutton controls for minimizing, maximizing and closing the configuration interface 200 as known in the art. The drop down menu bar 204 includes drop down menus related to file and help specific operations. The tool bar 206 includes various pushbutton controls for manipulating configuration files and information within the files. Pushbutton 210 is associated with the operation of opening a new configuration file. Pushbutton 211 is associated with the operation of opening a previously created configuration file. Pushbutton 212 is associated with the operation of saving a configuration file. When one of the pushbuttons 210-212 is selected, a secondary information interface may be exposed to assist the user in completing the desired operation.

The panel 215 is arranged with selection pushbuttons. A first set of pushbuttons are used to direct the indexer 129 to identify conference level feedback scores. The first set of pushbuttons includes pushbutton 221, which is associated with a strong positive feedback from conference participants, pushbutton 222, which is associated with positive feedback, pushbutton 223, which is associated with neutral feedback, pushbutton 224, which is associated with negative feedback and pushbutton 225, which is associated with strong negative feedback from conference participants. A second set of pushbuttons are used to direct the indexer 129 to identify when participant level feedback is present in the conference information. The second set of pushbuttons includes pushbutton 231, which is associated with a strong positive feedback from individual conference participants, pushbutton 232, which is associated with positive feedback, pushbutton 233, which is associated with neutral feedback, pushbutton 234, which is associated with negative feedback and pushbutton 235, which is associated with strong negative feedback from individual conference participants. A pushbutton 228 is available to direct the indexer 129 to identify when review comments are present in the conference information. A pushbutton 238 is available to direct the indexer 129 to identify when participant audio is to be identified in the conference information.

When configured as indicated in FIG. 2, the configuration interface 200 directs the indexer 129 to identify each instance in the conference where feedback is present for all available scoring levels at both a conference level and at an individual level. In addition, the configuration interface 200 directs the indexer 129 to identify each instance in the conference where review comments are present and where individual participant audio can be segregated from the audio conference 124.

Figure 3:
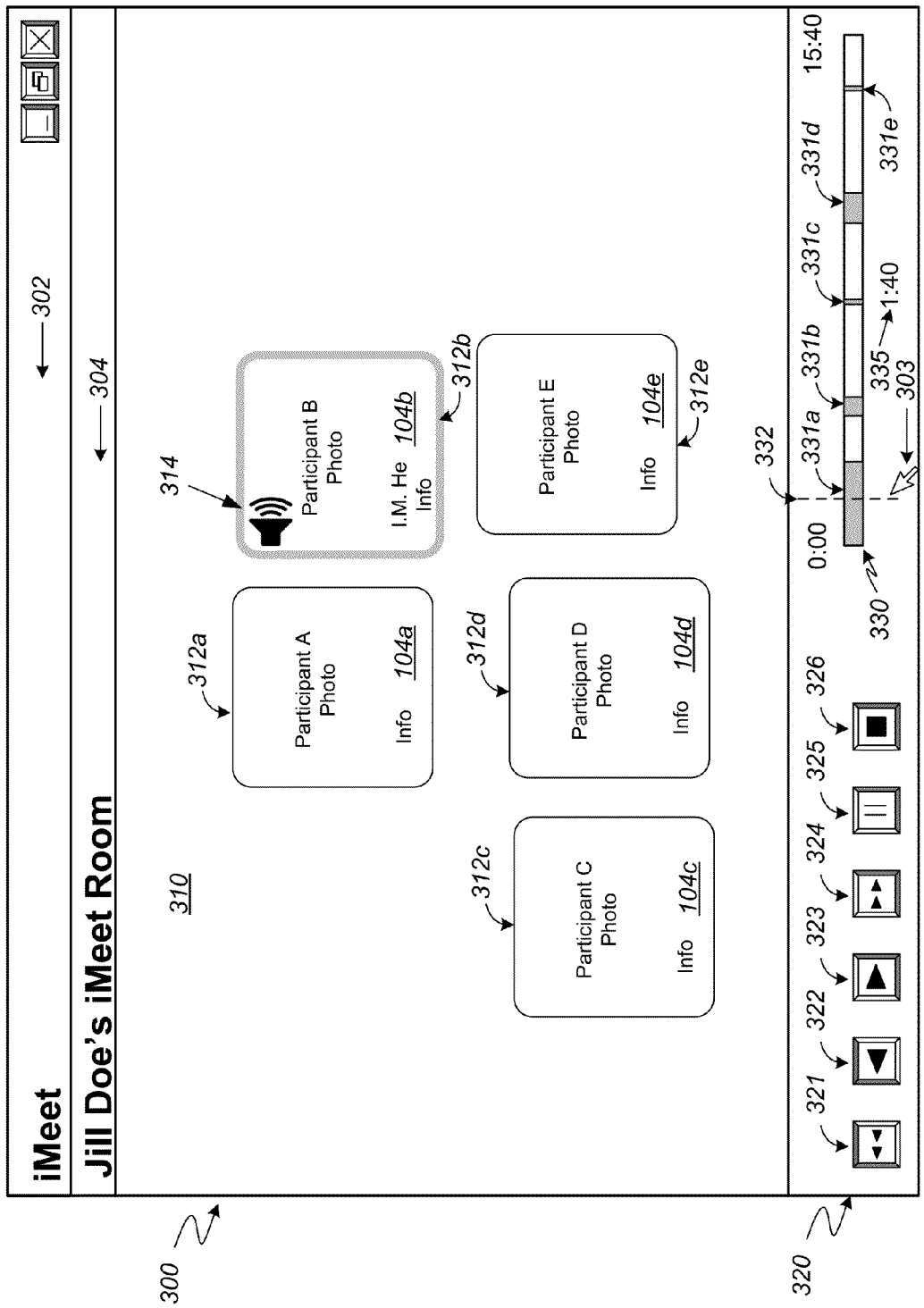
FIG. 3 is a schematic diagram illustrating an embodiment of the review interface of the conferencing system of FIG. 1 at a select time in a recorded conference.

FIG. 3 is a schematic diagram illustrating an embodiment of the review interface 300 of the conferencing system 106 of FIG. 1 at a select time in a recorded conference. The review interface 300 is published by the web server(s) 122 of the conferencing system 106 to a client device 102 or the client device 162 in response a request communicated by an authorized administrator, user or subscriber to the conference service supported by the conferencing system 106. An example review interface 300 is presented in the GUI 148 of the client device 102 and/or in a similar interface associated with the client device 162 (FIG. 1).

The review interface 300 exposes a recorded conference to an interested operator of the client device 102 or the client device 162. The review interface 300 provides a host of controls that enable the operator to selectively review a recorded conference 152 that is stored within the conference store 150a or the conference store 150b. The recorded conference includes both the audio content of the audio conference 124 and the synchronously recorded supplemental content that was presented via the GUI 148 to augment the audio conference 124. The review interface 300 includes a title bar 302, a room identification bar 304, a first or review panel 310 and a second or control panel 320. The title bar 302 includes a label identifying the review interface 300 as an iMeet interface and further includes well recognized pushbutton controls for minimizing, maximizing and closing the interface as known in the art. The room identification bar 304 identifies the room as belonging to Jill Doe. The review panel 310 may reveal all information that was provided during the original execution of the conference. Alternatively, the review panel 310 may filter or hide some of the information provided during the original execution of the conference to enable the reviewer to direct their attention to the activities of one or more participants of the conference and indicators of participant feedback during the conference. The review panel 300 may include additional controls for adjusting one or more aspects of such a filter.

In the illustrated embodiment, the review panel 310 of the review interface 300 includes participant objects 312 associated with respective participants of the conference. In an alternative embodiment, a group of participants is associated with a respective object that represents the group. Each of the participant objects 312 includes information identifying the respective participant or group of participants represented by the object. For example, participant object 312b is associated with conference participant I.M He. In addition to text including identifying information and a photo or other iconic representation of the respective participant, the participant object 312b includes one or more icons or indicators 314 that are presented and/or change in an observable manner when I.M. He is speaking. Indicator 314 may be enlarged, emboldened, vibrated or otherwise modified when I.M He has arranged for audio content to be played when he joins and/or speaks during the conference. Alternatively, the indicator 314 may be emboldened, displayed for a time and not displayed for a time (i.e., repeatedly turned on and off), presented with a different brightness, contrast or color than other information in the review panel 310 or adjusted in some other observable manner to attract the attention of a viewer of the review interface 300 to content of interest within the recorded conference.

In addition to an icon or indicator within a participant object such as the indicator 314, the review panel 310 is arranged to change a characteristic of a participant object 312 to identify when the associated participant has interacted in some manner within the conference. For example, the color, brightness, thickness, etc. of the border of the participant object 312b may be changed in a programmed way when I.M. He joins and/or leaves the conference, publishes a document, or takes some other action in the conference. As indicated above, a change in any characteristic of the indicator 314 or the participant object 312 can be used to index or identify a particular event in the recorded conference that may be of interest to a conference reviewer.

The control panel 320 includes pushbutton controls for selectively adjusting the playback or review of the recorded conference. The control panel 320 further includes an interactive time bar 332 presented on a timeline 330 for selectively reviewing the recorded conference. An operator of the client device 162 or the client device 102 uses a cursor and a pushbutton associated with a positional indicator or pointer displayed in the review interface 300 to select the controls presented in the control panel 320. The selection of pushbutton 321 directs the review interface 300 to perform a fast rewind through the recorded conference information. The selection of pushbutton 322 directs the review interface 300 to perform a rewind operation through the recorded conference information. The selection of pushbutton 323 directs the review interface 300 to play or present the recorded conference information. The selection of pushbutton 324 directs the review interface 300 to perform a fast forward operation through the recorded conference. The selection of pushbutton 325 directs the review interface 300 to present the current available graphical information in the panel 310. This information will not change until the operator of the client device 102 selects another control or closes the review interface 300. The selection of pushbutton 326 directs the review interface 300 to stop the playback of the recorded conference and removes information from the first or review panel 310.

The interactive time bar 332 provides an additional interactive control for selectively reviewing the recorded conference. In an example review mode, the interactive time bar 332 reflects a present or elapsed time of the recorded conference along a horizontally arranged timeline 330. The present or elapsed time is also presented in minutes and seconds in a display element 335. The timeline is arranged from left to right with a start time of 0:00 at above a left edge of the timeline 330 and the total time of the recorded conference displayed above a right edge of the timeline 330. In the example embodiment, the recorded conference includes 15 minutes and 40 seconds of synchronized audio and graphical information. An operator of the client device 162 or the client device 102 uses a cursor and a pushbutton or other control associated with a positional indicator 303 or pointer displayed in the review interface 300 to select or activate the interactive time bar 332. When activated, the operator can use the cursor to drag the interactive time bar 332 to a desired time along the timeline 330. For example, the operator can drag the interactive time bar 332 to review content at any desired time within the recorded conference.

When the interactive time bar is activated, the operator can select the pushbutton 322 to direct the review interface to skip to the start of the present content segment 331a. The selection of pushbutton 323 in this mode of operation directs the review interface 300 to skip to the start of a subsequent segment of interest 331b. The selection of pushbutton 324 directs the review interface 300 to skip the next subsequent segment of interest 331b and to relocate the interactive time bar 332 at the start of segment 331c. A repeated selection of pushbutton 324 in quick succession directs the review interface 300 to skip the next two subsequent segments of interest 331b, 331c and to relocate the interactive time bar to the start of segment 331d. An additional selection of pushbutton 324 in quick succession directs the review interface 300 to relocate the interactive time bar 332 at the start of segment 331e.

In this manner the conferencing system 106 provides interactive controls that advance or regress the recorded conference to an event or time indirectly subsequent or previous to a present review time to present those portions of the recorded conference where an identified participant is speaking, where a particular level of feedback was indicated, or a combination of these occurrences is indicated in the recorded conference. That is the review interface 300 skips or avoids entirely those portions of the recorded conference that are not in accordance with the indicated interest or interests of the reviewer. The interests of the reviewer include but are not limited to a characteristic feedback, content (including audio information) from an identified participant and/or a combination of interests. As indicated above, the indexer 129 (FIG. 1) analyzes the content within the recorded conference for identifiable characteristics in the recorded conference that correspond to one or more topics of interest to the reviewer.

The segments of interest 331a-331e are identified by the indexer 129 in accordance with a query or instruction (not shown) from the operator of the client device 102 indicating that information of a particular type is desired for review. For example, Jill Doe may be interested in reviewing each comment made by I.M. He during the recorded conference. By way of further example, Jill Doe may be interested in reviewing comments made by I.M. He where conference level feedback was positive. Any combination of one or more conference level feedback score, speaker or contributor of interest or groups thereof can be identified by a reviewer and used to review segments of the recorded conference that match the reviewer's identified criteria of interest.

Figure 4A:
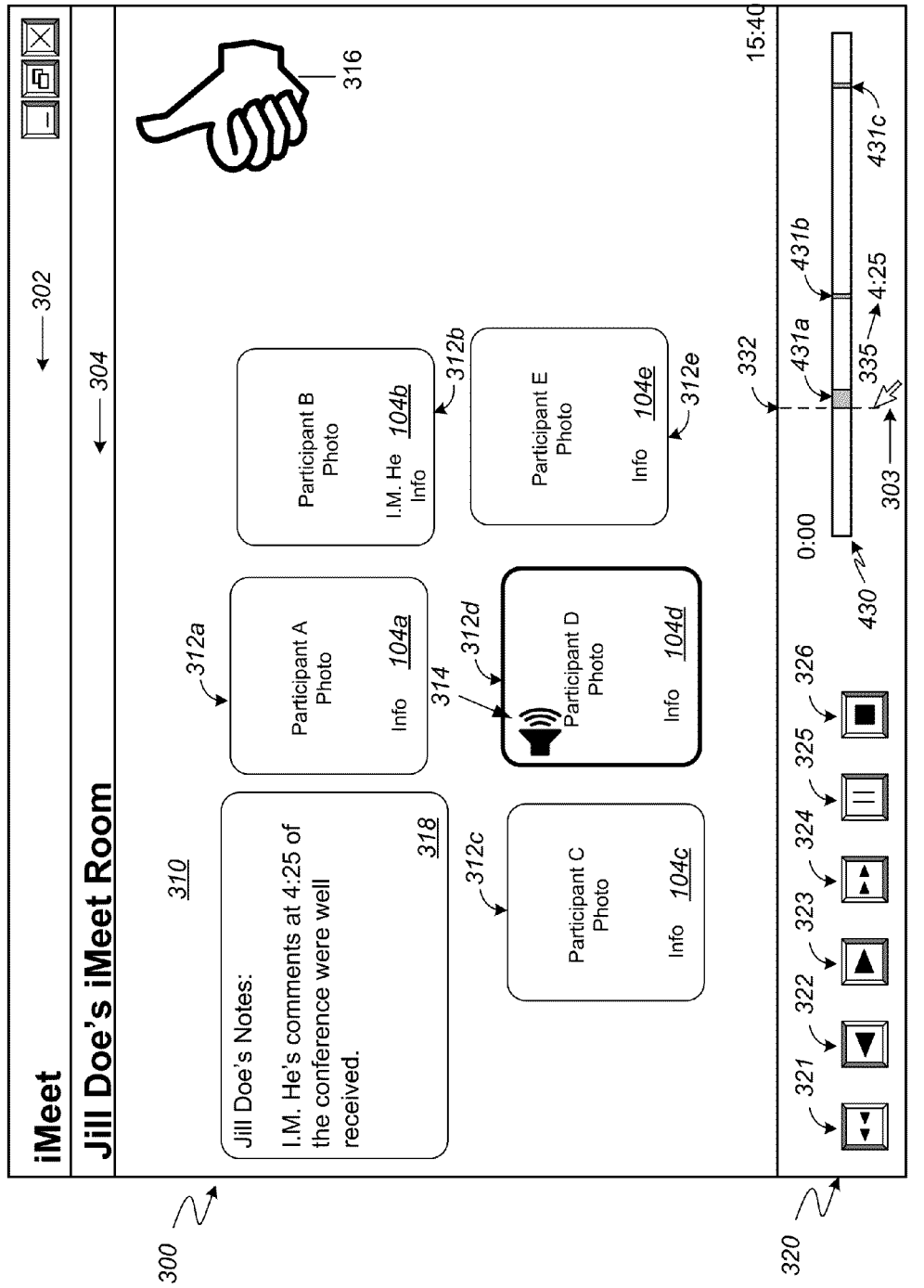
FIG. 4A is a schematic diagram illustrating an alternative embodiment of the review interface of the conferencing system of FIG. 1 at a first time in a recorded conference.

FIG. 4A is a schematic diagram illustrating an alternative embodiment of the review interface 300 of the conferencing system 106 of FIG. 1 at a select time in a recorded conference. The review interface 300 includes an icon 316 indicative of positive participant feedback at a time when the participant associated with participant object 312d is actively speaking in the recorded conference. In addition to the icon 316, the review interface operates in conjunction with controls associated with client device 102 or the client device 162 to enable Jill Doe to enter comments or notes in a note portion 318 of the review panel 310. One or more additional controls (not shown) are presented via the client device 102 or the client device 162 to enable Jill Doe to publish or otherwise control access to the notes or comments by other subscribers to the conferencing service.

In the example illustrated in FIG. 4A, the interactive time bar 332 is aligned with the start of segment 431a in the timeline 430. As further indicated by display element 335, the interactive time bar 332 is at a time 4 minutes and 25 seconds into the recorded conference. The content segments 431a-431c are indicative of those portions of the recorded conference where the indexer 129 has identified the combination of the participant associated with participant object 312d is speaking and conference level feedback is positive.

Figure 4B:
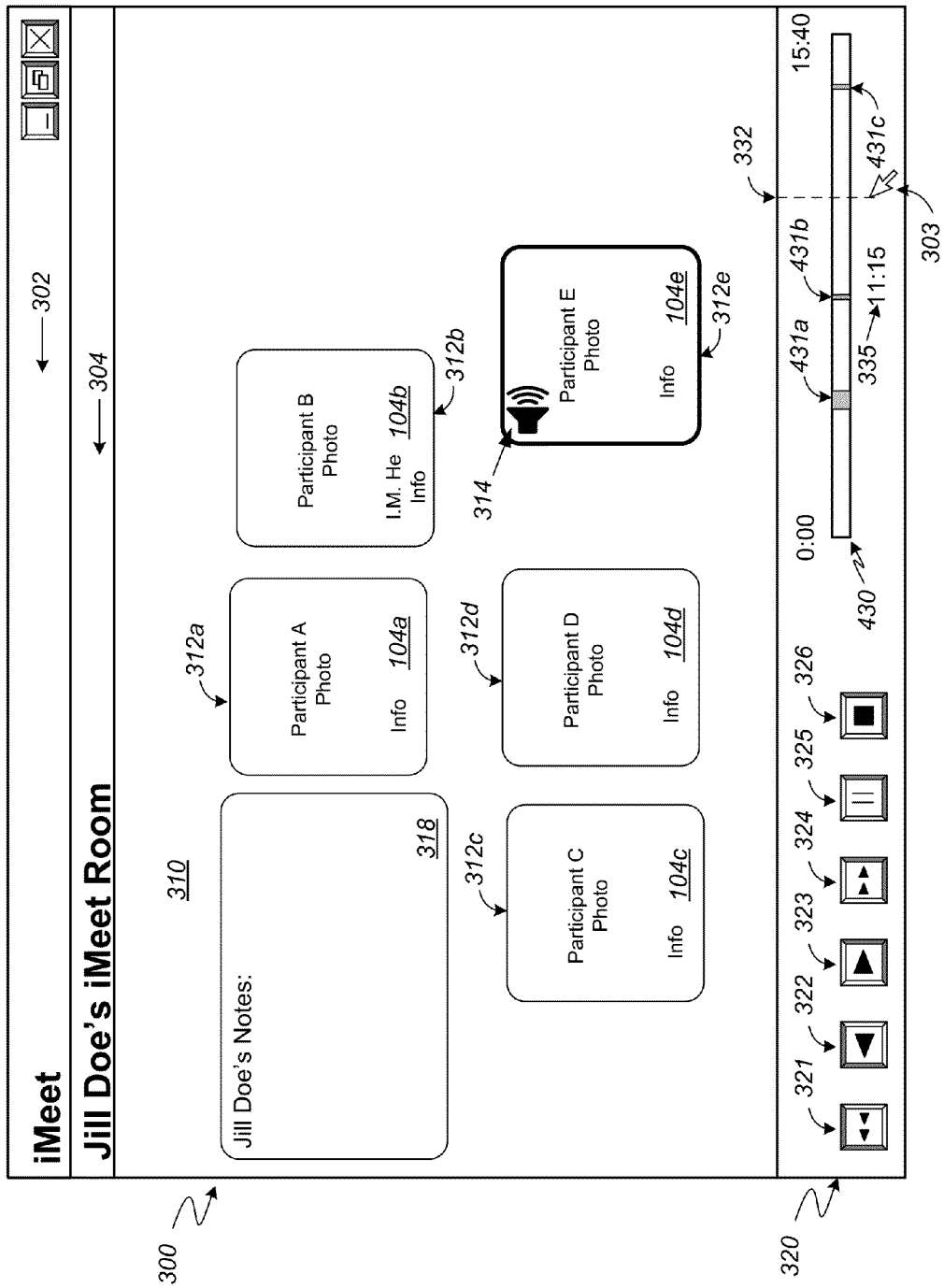
FIG. 4B is a schematic diagram illustrating the alternative embodiment of the review interface of the conferencing system of FIG. 1 at a second time in the recorded conference.

FIG. 4B is a schematic diagram illustrating an embodiment of the review interface 300 of the conferencing system 106 of FIG. 1 at a second time in the recorded conference. As indicated by the display element 335 associated with the timeline 430 and the relative position of the interactive time bar 332, Jill Doe has use the cursor 303 to select and drag the interactive time bar 332 to a time 11 minutes and 15 seconds into the recorded conference. As further indicated in the review panel 310 and by the location of the segments of interest in the timeline 430, the recorded conference is at a point in time where the participant associated with participant object 312e is speaking and there is no associated indicator of feedback present in the review interface 310. Accordingly, the review interface 300 of FIG. 4B shows that the operator can override the various selectors used to identify content of interest within the recorded conference. By deselecting the interactive time bar 332, the operator can use the pushbuttons 321-326 to control the playback or review of the recorded content absent any regard for feedback, speaker or any other content present in the recorded conference.

FIG. 5 includes a flow diagram illustrating an embodiment of a method 500 for providing a review interface for review of content of interest to a reviewer of a recorded conference. In block 502, a conferencing system 106 synchronously records an audio conference and content published in a conference user interface to generate a recorded conference. In block 504, a characteristic of the conference user interface is used to index the recorded conference. In block 506, the conferencing system 106 provides a review interface responsive to at least one indicator of content of interest within the recorded conference.

Figure 6:
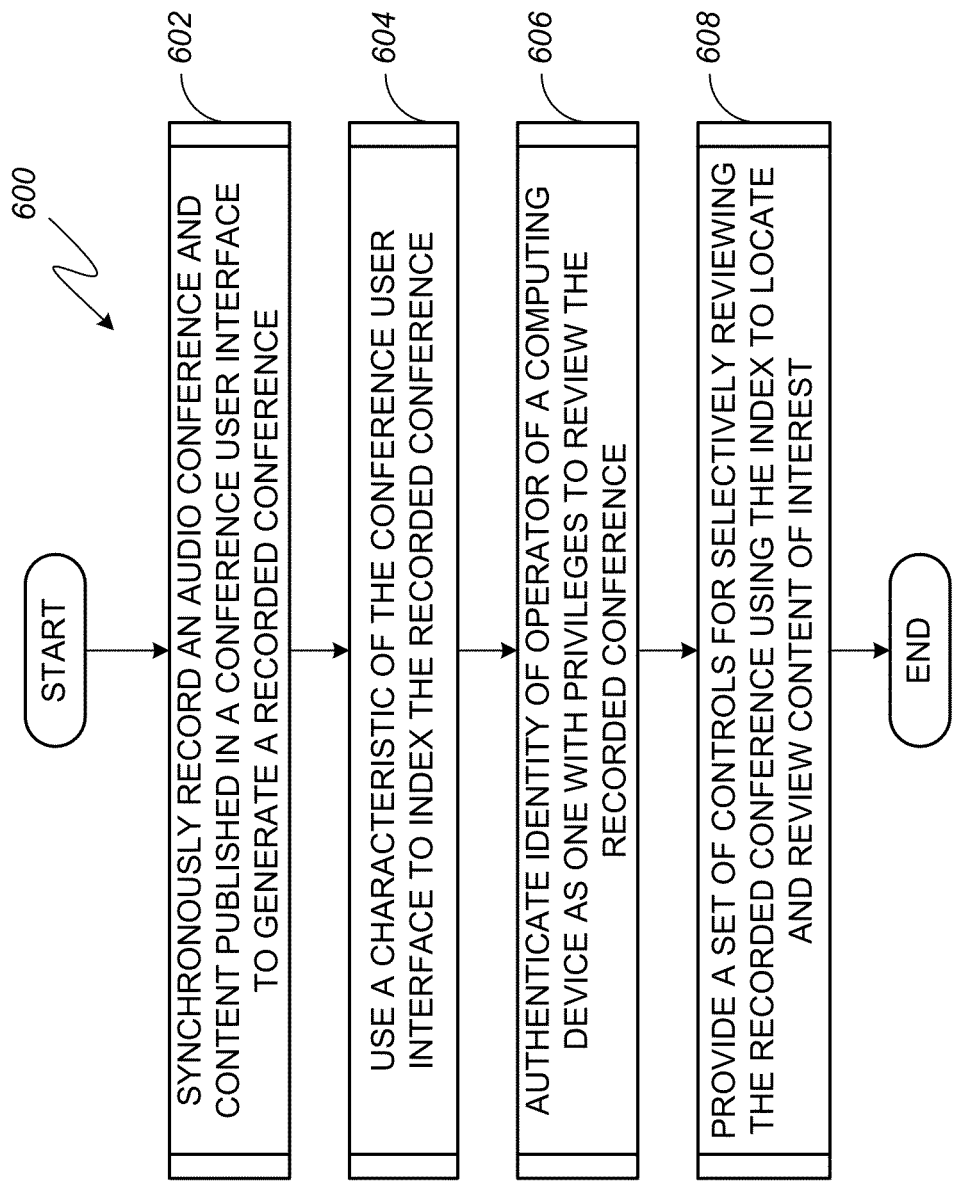
FIG. 6 is a flow diagram illustrating an alternative embodiment of a method for selectively reviewing a recorded conference.

FIG. 6 includes a flow diagram illustrating an embodiment of a method 600 for selectively reviewing a recorded conference. In block 602, a conferencing system 106 synchronously records an audio conference and content published in a conference user interface to generate a recorded conference. In block 604, a characteristic of the conference user interface, for example, a characteristic of a conference participant information cube is used to index the recorded conference. In block 606, the conferencing system 106 authenticates the identity of the operator of a computing device as one with privileges to review the recorded conference. Thereafter, in block 608, the conferencing system 106 provides a set of controls for selectively reviewing the recorded conference by using the index to locate content of interest to the operator of the computing device.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in a volatile memory or non-volatile memory and that is executed by hardware (e.g., microcontroller) or any other processor(s) or suitable instruction execution system associated with the conference system. Furthermore, the logical functions may be embodied in any computer readable medium for use by or in connection with an instruction execution system, apparatus, or device, such as a computer-based system, processor-containing system, or other system associated with the conference system that can fetch the instructions from the instruction execution system, apparatus, or device and execute the instructions.

It should be noted that this disclosure has been presented with reference to one or more exemplary or described embodiments for the purpose of demonstrating the principles and concepts of the systems and methods for selectively reviewing a conference. The systems and methods are not limited to these embodiments. As will be understood by persons skilled in the art, in view of the description provided herein, many variations may be made to the embodiments described herein and all such variations are within the scope of the appended claims.

What is claimed is:

1. A method, comprising:
synchronously recording an audio conference with content presented in a conference user interface to generate a recorded conference, the conference user interface provided to one or more participants during the audio conference and configured to enable the one or more participants to specify speaker feedback while corresponding participants are speaking during the audio conference;
indexing the recorded conference with the speaker feedback specified by the one or more participants via the conference user interface during the audio conference; and
during a replay of the recorded conference, simultaneously displaying a control panel with the conference user interface, the control panel comprising an interactive timeline of the recorded conference identifying one or more portions of the recorded conference in which a user-specified participant was speaking and the speaker feedback matches one of a plurality of scoring levels.

2. The method of claim 1, wherein the plurality of scoring levels associated with the speaker feedback comprises a positive scoring level, a neutral scoring level, and a negative scoring level.

3. The method of claim 1, wherein the control panel further comprises one or more controls for controlling la back of the one or more portions identified in the interactive timeline.

4. The method of claim 3, wherein the one or more controls comprise a next button, a previous button, and a pause button.

5. The method of claim 1, wherein the conference user interface displays a unique participant object for each of the participants in the audio conference.

6. The method of claim 1, wherein the speaker feedback comprises a text comment specified via the conference user interface.

7. A conferencing system, comprising:
client devices associated with respective display devices;
a conference host computer coupled to the client devices via one or more networks, the conference host computer operating a web server;
a recorded conference store coupled to the conference host computer, the recorded conference store including a synchronously recorded audio conference and content presented in a conference user interface defining a recorded conference, the recorded conference including an index to speaker feedback specified by one or more participants via the conference user interface during the audio conference; and the conference host computer configured to enable a user to replay the recorded conference and, during the replay of the recorded conference, simultaneously display a control panel with the conference user interface, the control panel comprising an interactive timeline of the recorded conference identifying one or more portions of the recorded conference in which a user-specified participant was speaking and the speaker feedback matches one of a plurality of scoring levels.

8. The conferencing system of claim 7, wherein the control panel enables the user to selectively review the recorded conference according to the index to the speaker feedback.

9. The conferencing system of claim 7, wherein the control panel further comprises one or more controls for controlling playback of the one or more portions identified in the interactive timeline.

10. The conferencing system of claim 7, wherein the one or more controls comprise a next button, a previous button, and a pause button.

* * * * *